(12) United States Patent
Sato

(10) Patent No.: US 6,249,931 B1
(45) Date of Patent: Jun. 26, 2001

(54) AIR WIPER

(76) Inventor: Toshiko Sato, 2-2, Yosamu-cho Atsuta-ku, Nagoya-shi, Aichi-ken (JP)

( * ) Notice: Subject to any disclaimer, the term of this patent is extended or adjusted under 35 U.S.C. 154(b) by 0 days.

(21) Appl. No.: 09/539,621

(22) Filed: Mar. 31, 2000

(30) Foreign Application Priority Data

Apr. 8, 1999 (JP) .................................................. 11-101300

(51) Int. Cl.⁷ .................................. B60S 1/54; B60S 1/56
(52) U.S. Cl. .................................................. 15/313; 296/91
(58) Field of Search ................................ 15/313; 296/91

(56) References Cited

U.S. PATENT DOCUMENTS

| | | | | |
|---|---|---|---|---|
| 4,505,001 | * | 3/1985 | Fasolino | 15/313 X |
| 5,419,005 | * | 5/1995 | Mori | 15/313 |
| 5,546,630 | * | 8/1996 | Long | 15/313 |

FOREIGN PATENT DOCUMENTS

| | | | | |
|---|---|---|---|---|
| 2411547 | * | 9/1975 | (DE) | 15/313 |
| 2699484 | * | 6/1994 | (FR) | 15/313 |
| 61-26657 | | 2/1986 | (JP) . | |
| 61-68956 | | 5/1986 | (JP) . | |
| 61-87147 | | 6/1986 | (JP) . | |
| 1-266037 | | 10/1989 | (JP) . | |
| 1-172936 | | 12/1989 | (JP) . | |
| 3-284450 | * | 12/1991 | (JP) | 15/313 |
| 4-110660 | | 9/1992 | (JP) . | |
| 6-171473 | * | 6/1994 | (JP) | 15/313 |
| 09066811 | | 3/1997 | (JP) . | |

* cited by examiner

*Primary Examiner*—Chris K. Moore
(74) *Attorney, Agent, or Firm*—Arent Fox Kintner Plotkin & Kahn

(57) ABSTRACT

An air wiper for an automobile is disposed near a viewing surface on which adhering substances are to be removed, and is provided with an air jet section having at least one air jet port. Air is discharged toward the surface and the adhered substances on the viewing surface are removed. The air jet port can be moved in a pivoting or rotating manner so that the air can be jetted over substantially the whole surface of part.

12 Claims, 7 Drawing Sheets

AIR WIPER

BACKGROUND OF THE INVENTION (1) Field of the Invention

The present invention relates to an air wiper which is arranged in a vicinity of a viewing surface through which a driver views an object, and can remove substances such as drops of water, blur or the like, adhering to the viewing surface. The viewing surface is, for example, a side mirror such as a fender mirror or a door mirror and the front side window of an automobile. Particularly the present invention relates to an air wiper which can remove adhered substances from the viewing surface efficiently and occupies a small volume.

(2) Description of Related Art

When a man drives a vehicle, such as an automobile or a truck on a highway, he confirms rearward vehicle safety using a side mirror such as a door mirror or a fender mirror. However, in inclement weather, such as rain or dense fog, drops of water adhere or blur is produced on the glass mirror surface and safety confirmation may become difficult. Also in order to see the side mirror through the front side window, the side mirror surface cannot be seen clearly even when the drops of water, the blur or the like adhere to the surface of the front side window glass. As a result, safety confirmation using the side mirror becomes difficult.

Therefore, various air wipers have been proposed where heated air or the like is forcibly discharged onto the viewing surface of the side mirror and the front side window glass, and substances adhering to the viewing surface of the side mirror and the front side window glass are removed.

For example, JP-U 61-68956 discloses that pressurized heated air is discharged from a number of jet holes provided at a side part of the door mirror.

In the prior art air wiper, however, since the heated air must be discharged simultaneously over the entire surface of the mirror, a plurality of the jet holes are provided or a large diameter jet hole is provided. Therefore, since the area of the opening of jet hole becomes larger, the speed of the jetted air becomes slower. As a result, in order to remove the adhering substances easily, the velocity of the air must be raised by a fan, a compressor or the like. Also, since the air must be forcibly discharged over a wide region such as the entire surface of the mirror, the jet holes must be arranged over the wide region and the space occupied by the air wiper is apt to become large.

In view of the above-mentioned aspects, an object of the present invention is to provide an air wiper which can remove adhered substances such as drops of water, blur or the like, adhering to a viewing surface when a driver views a visual object through, for example, a side mirror, a front side window or the like. It is another object of the present invention to provide an air wiper which can remove these substances efficiently, and occupy a small space.

SUMMARY OF THE INVENTION

The present invention solves the above-mentioned problems.

An air wiper is arranged in a vicinity of a viewing surface to which adhered substances are to be removed, and comprises an air jet section having at least one air jet port. Air is discharged toward the viewing surface and substances adhering to the viewing surface are removed. The air jet port is moved so that the air can be discharged over the entire surface.

Since the present invention is constituted in that the air jet port moves, the air discharged from one air jet port is forcibly discharged over a wide region of the viewing surface on which adhered substances are to be removed. Therefore, the airjet ports do not have to be arranged over a wide region and the air wiper can be formed compactly.

Also, if such constitution is that the air jet section is rotatably moved, the air wiper can be formed more compactly.

Further, if such constitution is that the air is heated by an air conditioning apparatus supplied with the vehicle, the air wiper can be manufactured at a low cost. It is preferred, when a moisture-proofing function is used in the air conditioning apparatus, drier air can be discharged.

As the above-mentioned constitution, more specifically, the air jet section is formed in a substantially cylindrical shape and is arranged to project from the viewing surface on which the adhered substances are to be removed. On a side surface of the air jet section, the air jet port is formed in slanting fashion toward the viewing surface, and a cover is formed so as to cover an upper surface and a side surface of the air jet port. A notched portion is formed on the cover in close proximity to the viewing surface, and the air jet section is rotatable about a rotation axis.

Further, it is preferable that the notched portion is positioned in close proximity to the viewing surface and is formed in cross-section in a substantially tapered shape so as to slant toward the viewing surface, so that the flow of air discharged from the air jet port toward the viewing surface is not prevented.

It is preferable that the air jet port is formed in cross-section in the substantially tapered shape so that an inner diameter of the air outlet is smaller than that of the air inlet, so that the pressure of the discharged air can be further raised.

Further, it is preferable that a plurality of air jet ports are formed so that the amount of air to the rotating air jet section increases.

It is preferable that individual air jet ports are formed so that the air can be discharged to different respective portions of the viewing surface, so that the air is discharged onto the different surface viewing portions to remove securely adhered substances on the viewing surface over a wide region.

DESCRIPTION OF THE PREFERRED EMBODIMENTS

The present invention will be described by way of the embodiments shown in the accompanying drawings. The present invention is not limited to the embodiments. Any modification within the features of claims or any equivalent relating to the features shall be included within the scope of claims.

Figure 1:
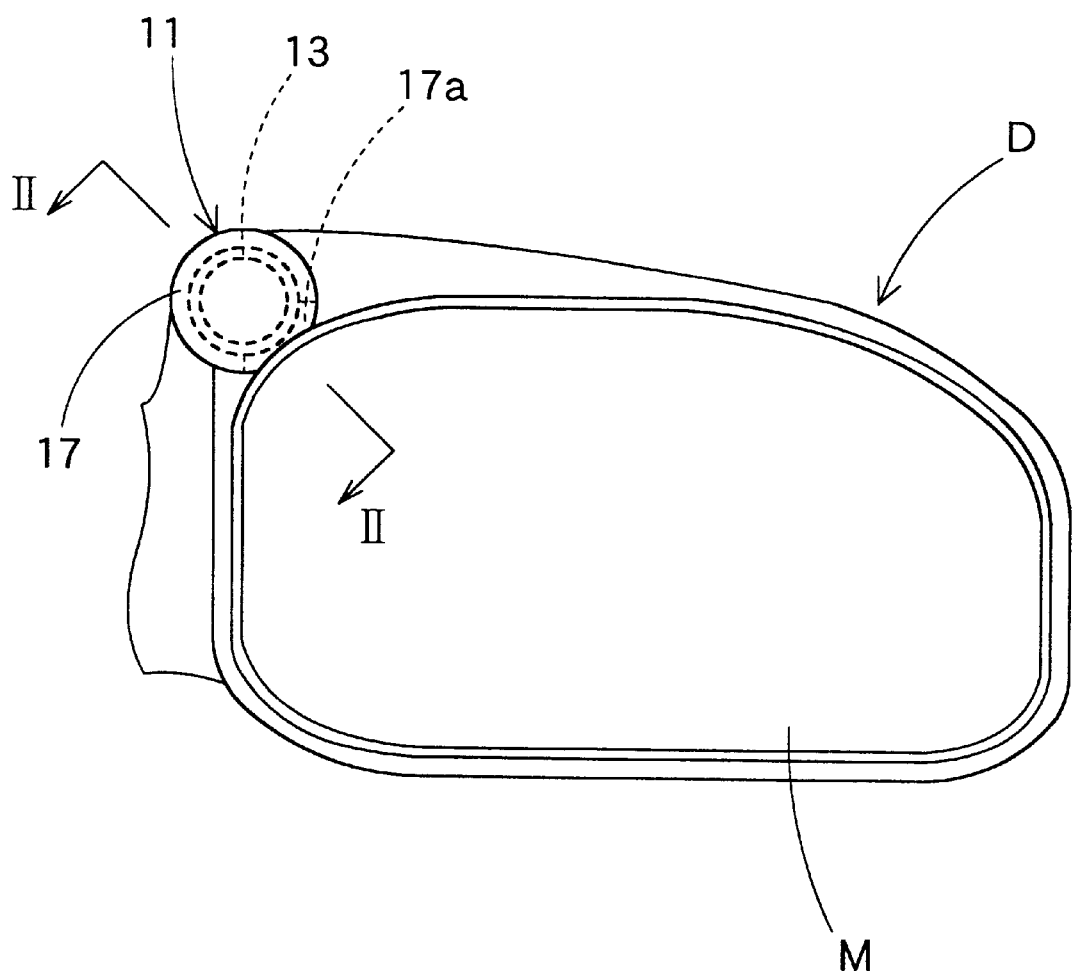
FIG. 1 is a front view of an embodiment of an air wiper of the invention arranged in a vicinity of a door mirror.

The first embodiment will be described by an example of an air wiper arranged in a vicinity of a door mirror as shown in FIG. 1.

Figure 2:
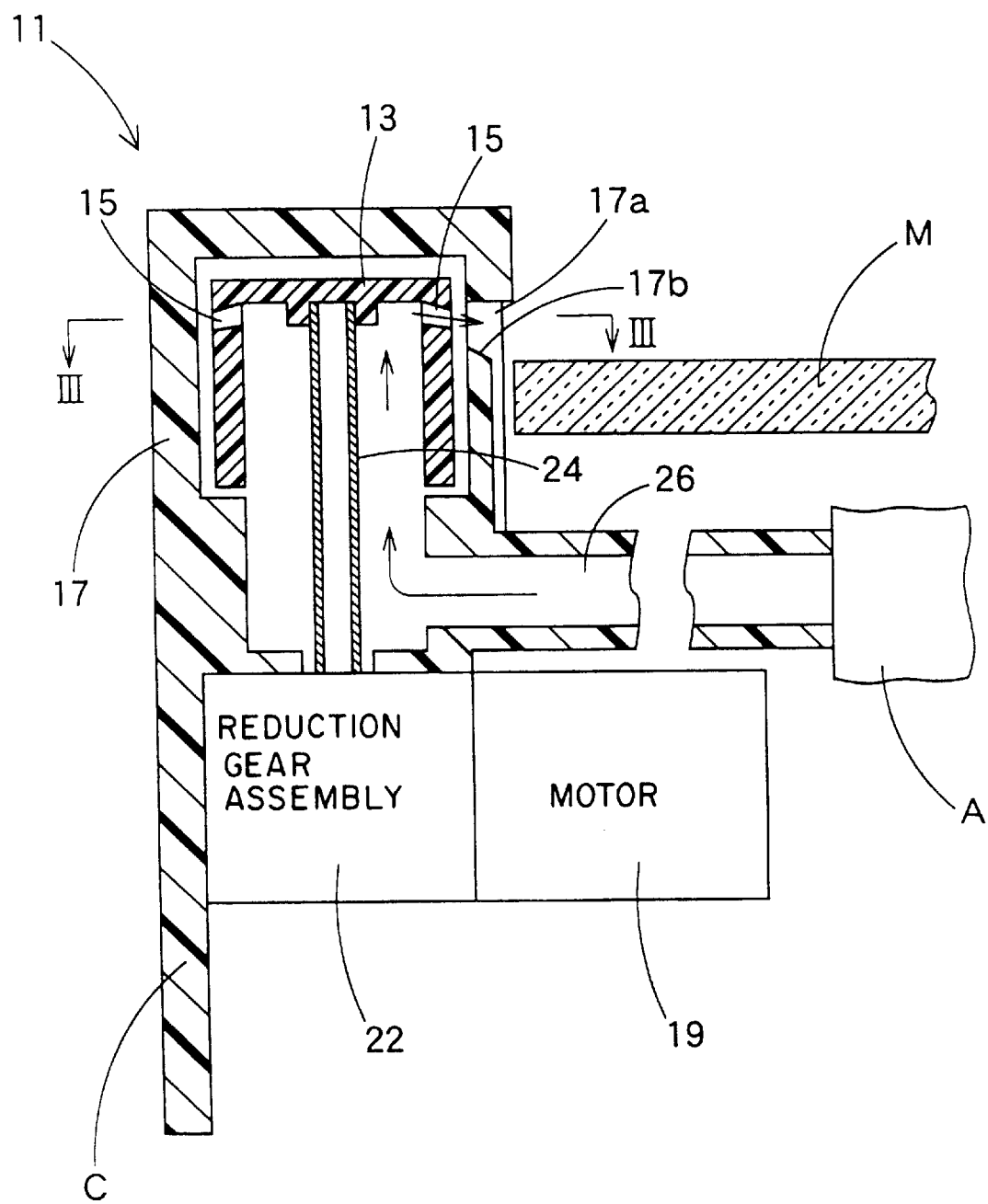
FIG. 2 is a fragmentary enlarged sectional view of the air wiper taken along line II—II in FIG. 1.
Figure 3:
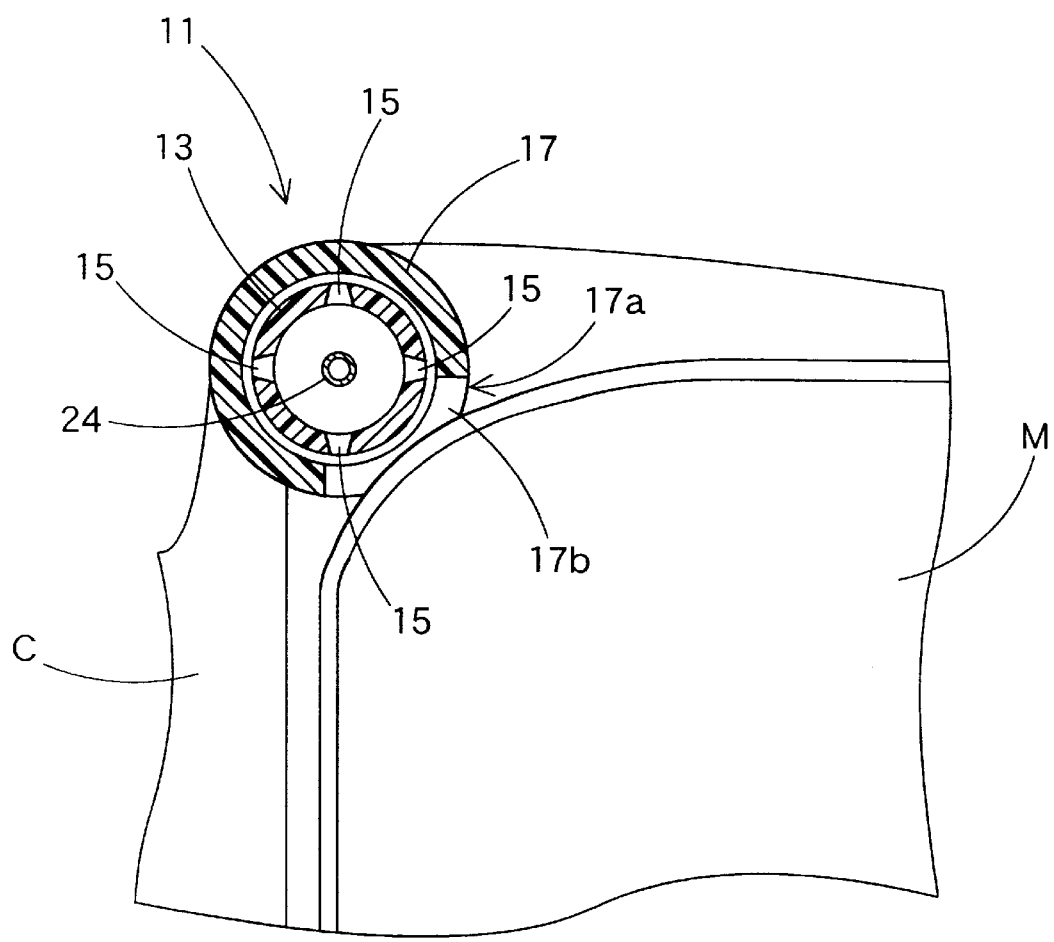
FIG. 3 is a sectional view taken along line III—III of the air wiper in FIG. 2.

An air wiper 11 in this embodiment as shown in FIG. 1 is arranged in a vicinity of a door side corner above a mirror body M in a door mirror D. As shown in FIGS. 2 and 3, the air wiper 11 comprises an air jet section 13 in a substantially cylindrical shape projecting from the mirror body M and arranged so that an upper surface is positioned nearly in parallel to the mirror body M, air jet ports 15 are arranged at a side surface of the air jet section 13 and are formed in a substantially through hole shape, and a cover 17 covers the upper surface and the side surface of the air jet section 13. In addition, as shown in FIG. 2, the cover 17 is formed integrally with the cover C of the door mirror D.

As shown in FIG. 2, a center portion of the air jet section 13 is connected to a rotary shaft 24 connected to a motor 19 and a reduction gear assembly 22 arranged within the door mirror D, so that the air jet section 13 is rotated about the rotary shaft 24 in an oscillating fashion, that is, forward rotation and reverse rotation are repeated. As the motor 19 in this embodiment is an electric motor, an air motor or other type motor may be used. Also in this embodiment, although the air jet section 13 is rotated forwardly and rearwardly repeatedly using an appropriate means, the motor 19 is controlled by an electronic circuit or the like, or a crank and a cam. However, of course, even such means need not to be used. The rotary shaft 24 of the air jet section 13 may be simply connected directly to rotary shaft of the motor to rotate forwardly and rearwardly. Further, regarding the direction of the rotation, repetition of the forward rotation and the rearward rotation as described for this embodiment need not be performed. Rotation in only one direction is possible.

On a side surface of the air jet section 13, as shown in FIG. 3, four air jet ports 15 are arranged at nearly equal spacing along and substantially at the same level. Each air jet port 15 is formed slanting toward the viewing surface of the mirror body M as shown in Fig.2. Each air jet port 15 as shown in FIGS. 2 and 3, is formed in cross-section in a substantially tapered shape so that an inner diameter of the air outlet (the outside of the air jet section 13) is smaller than that of the air inlet (the inside of the air jet section 13). In the cover 17, a portion in close proximity to the mirror body M (about ¼ of the whole circumference in FIG. 2) is notched in a substantially rectangular shape and a notched portion 17a is formed. Then, the air jet port 15 is exposed through the notched portion 17a. When in use, the air jet section 13 is rotated and the air jet port 15 is exposed through the notched portion 17a. Also, as shown in FIG. 2, an end of the notched portion 17a in close proximity to the surface of the mirror body M (the lower end in the figure) is formed in cross-section in a substantially tapered shape so that it is slanted toward the viewing surface of the mirror body M to form a slant surface 17b.

As shown in FIG. 2, the air jet section 13 is connected to one end of a draft tube 26, and other end of the draft tube 26 is connected to an air supply member such as an air conditioning apparatus A of a vehicle. Then, air is supplied to the air jet section 13 from the air supply member via the draft tube 26. In this embodiment, the draft tube 26 is connected to the air conditioning apparatus A of the vehicle, and air heated by the air conditioning apparatus A is supplied to the air jet section 13. The velocity of the air and the amount of air are appropriate if adhered substances such as drops of water adhering to the viewing surface of mirror body M can be removed. Also, the heated temperature of the discharged air is arbitrarily selected, and when the air conditioning apparatus A is not used for heating, unheated air can be used. However, if the discharged air is at high temperature, the adhered substances can be removed easily. Consequently, it is preferable that the discharged air is at high temperature. More specifically, it is preferable that the temperature of the discharged air is higher than the outside atmospheric air and lower than the softening point of the viewing surface of the mirror and its constituent components, that is, in general, within the range of 25° C. to 70° C.

Next, the use mode of the air wiper 11 in this embodiment will be described. The air wiper 11 in this embodiment is used in a state that the air conditioning apparatus A is used in order to supply air from the air conditioning apparatus A within the vehicle. Particularly, it is preferable that the air conditioning apparatus is used in its heating state. For the air wiper 11, a switch (not shown) (usually formed within the vehicle) is turned on and the jet section 13 connected through the rotary shaft 24 to the motor 19 is rotated. At the same time, the air heated by the air conditioning apparatus A is applied from the draft tube 26 to the inside of the air jet section 13 and is discharged from the air jet port 15. Then the heated air is prevented from exiting the air jet port 15 because it is covered by the cover 17. As a result, the air is discharged only from the air jet port 15a exposed through the notched portion 17a toward the surface of the mirror body M. For the air wiper 11 in this embodiment, since the air jet section 13 is rotated about the rotary shaft 24, the air jet port 15 is moved about a circumferential direction. Attendant on moving of the air jet port 15, the air jet port 15 is also moved. Therefore, the air discharged from the air jet port 15 can be forcibly discharged over a wide region of the viewing surface of the mirror body M. Since the air wiper 11 in this embodiment is constituted in that the draft tube 26 is connected to the air conditioning apparatus A of the vehicle and the heated air is supplied, the air wiper 11 can be used whenever the air conditioning apparatus A is used, and it can be used when the vehicle is stopped. If a moisture-proofing function is used in the air conditioning apparatus A, even when the humidity of the outside air is high such as during rain, the air with moisture removed can be discharged from the air jet port 15.

For the air wiper 11 in this embodiment, the air jet 11 section 13 is rotated when in use and the air jet port 15 formed at the side part of the air jet section 13 is oscillated about the circumferential direction. Then, the air discharged from one air jet port 15 can be discharged over a wide region of the viewing surface of the mirror body M. Therefore, the air jet port 15 need not be arranged over the wide region, and the air wiper 11 can be formed compactly. Moreover, the visibility of the mirror is not obscured, and the aesthetic appearance of the mirror door is not greatly diminished. Also since only one air jet port 15 is exposed from the notched portion 17 during use, the air at a high velocity can be discharged in comparison with an air wiper in the prior art.

In this embodiment, the draft tube 26 is connected to the air conditioning apparatus of the vehicle, and the air exhausted from the air conditioning apparatus is supplied to the air jet section 13. However, the invention is not limited to this constitution. The air supplied to the air jet section 13, of course, may be supplied by a heater and a fan provided separately. In this case, the fan can be arranged at the motor 19 so as to rotate the air jet section 13. Further, in the heating method of the air, the air can be heated not only by the air conditioning apparatus, but by the waste heat of the engine or the like. However, from the viewpoint of manufacturing cost, it is preferable that the air is heated by the air conditioning apparatus. Further, if the air conditioning apparatus is utilized, the air with the moisture removed can be discharged in the event that the moisture proofing function is used in the air conditioning apparatus. In this embodiment, although the air wiper 11 is positioned in the vicinity of the door side corner above the mirror body M, this position of the air wiper 11 is not limited to this. The air wiper 11 may be disposed in an arbitrary position such as at a lower position, a center position or the like. However, from the viewpoint of removing the adhered substances, it is preferable that the air wiper 11 is disposed above the mirror body M. Further, from the viewpoint that the door mirror D itself is small, it is preferable that the air wiper 11 is disposed in the vicinity of the door side corner above the mirror body M adjacent to the mounting position of the door mirror D on the vehicle.

In this embodiment, although the four air jet ports 15 are formed at the air jet section 13, the number of air jet ports 15 is not limited to this, but the number may be singular or plural. In the case of a singular number, the amount of the discharged air is small with respect to the rotation of the air jet section 13. It is preferable that the plural air jet ports 15 are formed. Also, from the viewpoint of the air velocity, it is preferable that the air jet ports 15 are formed so that the number of the air jet ports 15 exposed one at a time through the notched portion 17a during use. However, if the air can be discharged sufficiently, a plurality of air jet ports 15 may be exposed through the notched portion 17a. Also, in this embodiment, the air jet port 15 is formed in cross-section in a tapered shape so that the inner diameter of the air outlet (the outside of the air jet section) is smaller than that of the air inlet (the inside of the air jet section). However, the cross-sectional shape of the air jet port 15 is not limited to this. The air jet port 15 may be formed so that the air outlet and the air inlet are provided with substantially the same inner diameters. However, it is preferable that the inner diameter of the air outlet is smaller than that of the air inlet, so that the pressure of the discharged air can be further raised.

In this embodiment, since the air jet section 13 is disposed in the vicinity of the door side corner above the mirror body M, the notched portion 17a is formed over approximately ¼ of the circumference at a right lower end in close proximity to the mirror body M as shown in FIG. 3. However, the shape of the notched portion 17a and its forming position are not limited to this. It is possible to change the shape of the notched portion 17a and its forming position due to the position of the air jet section 13. For example, when the air jet section 13 is arranged in the vicinity of a center of and above the mirror body M, the notched portion 17a may be formed over about ⅓ to ½ of the circumference at a position in close proximity to the mirror body M. If the size of the notched portion 17a is varied, attendant on the variation, the number of the air jet ports 15 may be varied. Further in this embodiment, the end of the notched portion 17a in close proximity to the viewing surface of the mirror body M is formed in cross-section in a substantially tapered shape and a slant surface 17b is made so that the end of the notched portion 17a is slanted toward the surface of the mirror body M. Since the shape of the end of the notched portion 17a is not limited to this, the end may be formed substantially in parallel to the mirror body M. However, since the air jet port 15 is slanted toward the surface of the mirror body M, the air discharged from the air jet port 15 is also discharged toward the viewing surface of the mirror body M. Therefore, in order allow the flow of the discharged air, it is preferable that the end of the notched portion 17a in close proximity to the surface of the mirror body M is made a slant surface 17b slanted toward the surface of the mirror body M. Then, it is preferable that a slant angle of the slant surface 17b against the surface of the mirror body M is formed larger than a slant angle of the air jet port 15 against the viewing surface of the mirror body M.

Figure 4:
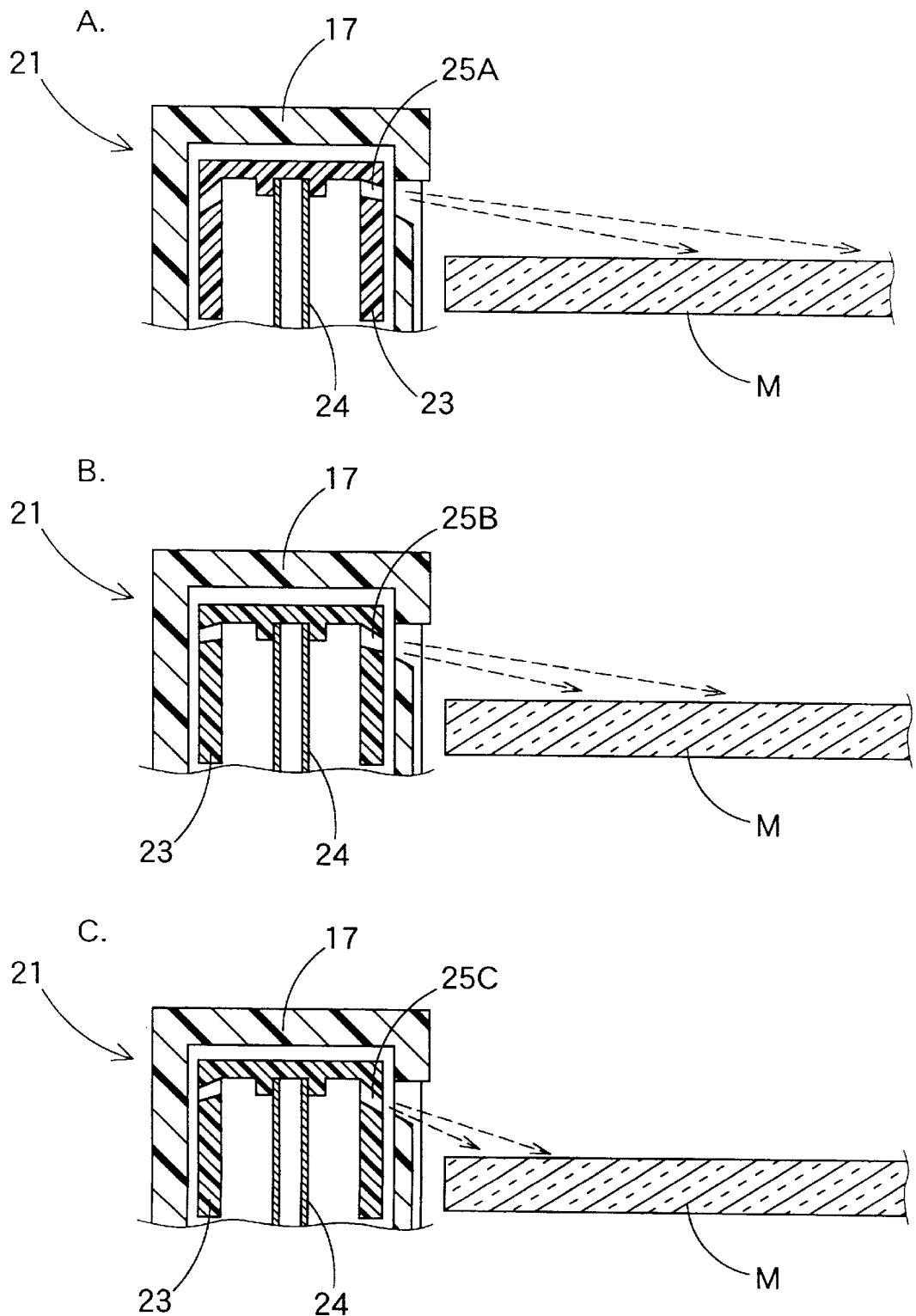
FIG. 4 is a fragmentary enlarged sectional view of another embodiment of the air wiper of the invention showing air discharging from an air jet port.
Figure 6:
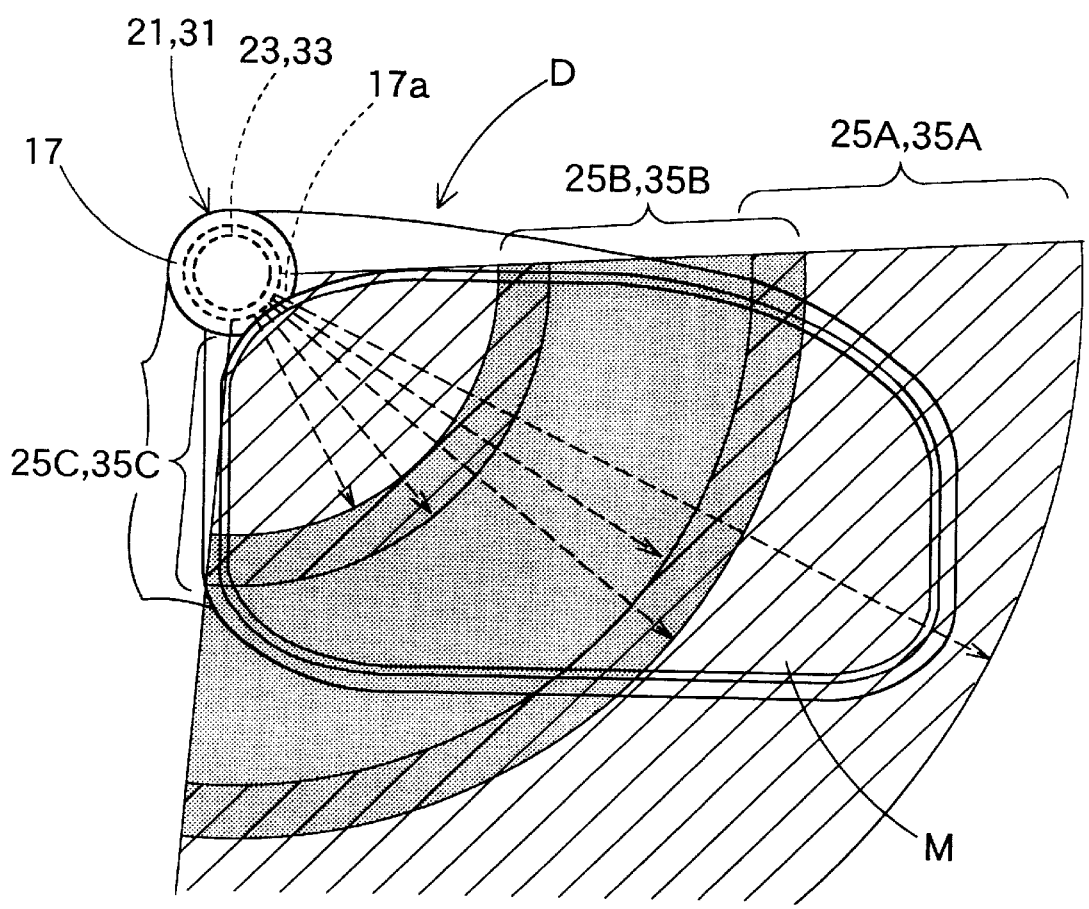
FIG. 6 is a schematic view indicating a range along which air is discharged from the individual air jet ports of the air wiper shown in FIG. 4 or FIG. 5.

When a plurality of air jet ports are formed, as shown in FIG. 4, an air wiper 21 can be formed using an air jet section 23 comprising air jet ports 25A, 25B, 25C formed at different angles against the viewing surface of the mirror body M respectively. In the air wiper 21 of such constitution, since the angles of the air jet ports are different depending on the individual air jet ports 25A, 25B, 25C, the discharged air is discharged mainly to different surfaces respectively on the viewing surface of the mirror body M as shown in FIG. 4 and FIG. 6. Therefore, it is preferable that the air wiper 21 comprising the air jet section 23 can securely remove adhered substances on the viewing surface of mirror body M over a wide region.

Figure 5:
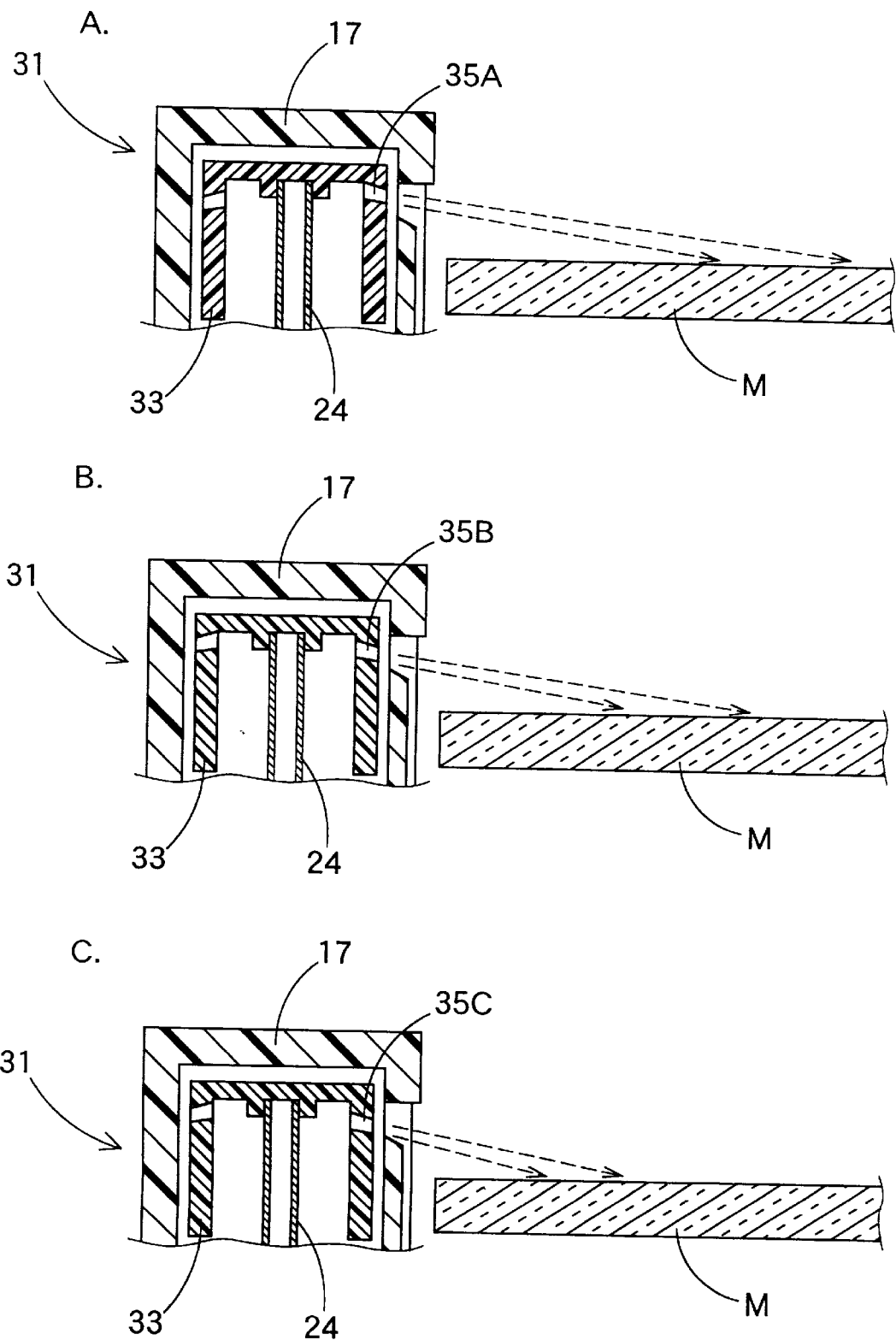
FIG. 5 is a fragmentary enlarged sectional view of still another embodiment of the air wiper of the invention showing air discharging from the air jet port.

Also, as shown in FIG. 5, an air wiper 31 can be formed using an air jet section 33 comprising air jet ports 35A, 35B, 35C formed with different distances respectively from the viewing surface of the mirror body M. Also in the air wiper 31 in this constitution, since the air discharged from the individual air jet ports 35A, 35B, 35C is discharged mainly to different surface positions respectively on the viewing surface of the mirror body M as shown in FIG. 5 and FIG. 6. In a similar manner to that as above described, the air wiper using the air jet section 33 can securely remove adhered substances to the surface of the mirror body M over a wider region.

In this embodiment, although the cover 17 is formed integrally with the cover C of the door mirror D, the cover 17 and the cover C of the door mirror D can be formed separately and fixed to each other.

Also, in this embodiment, although the door mirror is exemplified as the mirror with the air wiper, the air wiper of the present invention can be applied also to a fender mirror.

Figure 7:
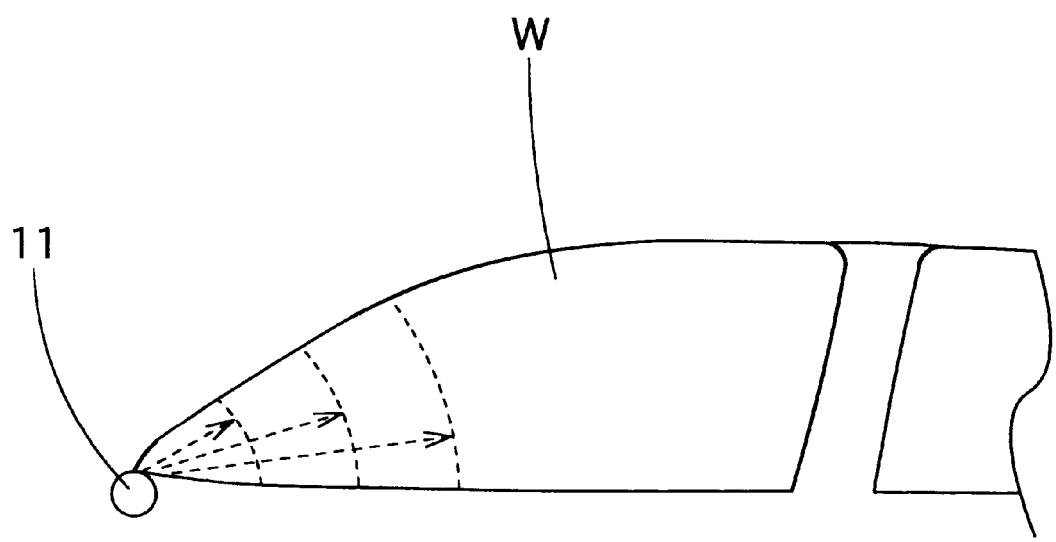
FIG. 7 is a front view of the air wiper of the invention arranged in a vicinity of a front side window.

In this embodiment, although the air wiper 11 arranged in the vicinity of the door mirror D is exemplified, the setting position of the air wiper 11 of the present invention is not limited to that as above described, but it can be arranged also in the vicinity of a front side window W as shown in FIG. 7. In FIG. 7, the air wiper 11 is arranged in the vicinity of the position where the door mirror is arranged and the air is discharged to the front side window W in the position in close proximity to the door mirror. In addition, the arrangement position of the air wiper 11 is not limited to that shown in the figures, but it can be arranged in other positions, for example, at a lower side, at a center or the like. Also, the air can be discharged onto the entire surface of the front side window W. Moreover, the shape of the notched portion 17a and the number of the air jet ports 15 can be changed depending on the arrangement position of the air wiper 11. Also, the window with the air wiper arranged therewith is not limited to a front side window as above described, but, it can be arranged, of course, also in the vicinity of other windows.

Further, two air wipers 11 of the present invention can be simultaneously arranged in the vicinity of the door mirror D and in the vicinity of the front side window W. When these air wipers 11 are arranged in the vicinity of both, since adhered substances on the viewing surface of the door mirror D and on the surface of the front side window W can be removed together, it is preferable that the visibility of the driver further becomes enhanced. In this embodiment, the air wiper 11 in use is constituted in that the air jet section 13 is formed in a substantially cylindrical shape and the air jet ports 15 are arranged on the side surface. However, if the air jet ports are constituted to be able to discharge the air throughout the viewing surface, the air wiper 11 is not limited to that as above described. For example, the air jet section and the air jet ports may be rotated in reciprocation at angles of definite range and operated in oscillation.

What is claimed is:

1. An air wiper for a vehicle arranged in a vicinity of a viewing surface with substances removably adhering thereto, the air wiper comprising:

an air jet section having at least one air jet port, wherein air is discharged toward the viewing surface so that adhered substances on the viewing surface are removed, the air jet port moves in a pivoting or rotating manner so that the air can be directed over and discharged onto at least substantially the entire viewing surface.

2. An air wiper as set forth in claim 1, wherein the air jet section is rotated thereby the air jet port is moved.

3. An air wiper as set forth in claim 2, wherein the air is heated and supplied by an air conditioning apparatus of a vehicle.

4. An air wiper as set forth in claim 3, wherein the air jet section is formed in a substantially cylindrical shape and is arranged to project from the viewing surface in order to remove the adhered substances, the air jet port is formed on a side surface of the air jet section so as to slant toward the viewing surface, and a cover is formed so as to cover an upper surface and the side surface of the air jet port, the cover is provided with a notched portion formed at a position in close proximity to the viewing surface, and the air jet section is formed rotatable about a rotation center near a center position.

5. An air wiper as set forth in claim 4, wherein the position in close proximity to the surface of the notched portion is formed in cross section in a substantial taper shape so as to slant toward the viewing surface.

6. An air wiper as set forth in claim 5, wherein the air jet port is formed in cross section in a substantial taper shape, so that an inner diameter of an air outlet is smaller than an air inlet.

7. An air wiper as set forth in claim 6, wherein a plurality of air jet ports are arrange on the air jet section to provide a plurality of individual air outlets.

8. An air wiper as set forth in claim 7, wherein individual air jet ports are formed so that the air can be discharged to different portions respectively on the viewing surface.

9. An air wiper as set forth in claim 8, wherein the individual air jet ports have different slant angles respectively against the viewing surface.

10. An air wiper as set forth in claim 8, wherein the individual air jet ports are formed so that distances from the viewing surface to the individual air outlets are different respectively.

11. An air wiper as set forth in claim 1, wherein the viewing surface with removably adhering substances is a mirror.

12. An air wiper as set forth in claim 1, wherein the viewing surface with removably adhering substances is a window.

* * * * *